(12) United States Patent
Hauck et al.

(10) Patent No.: US 6,356,558 B1
(45) Date of Patent: Mar. 12, 2002

(54) ARBITRATION TECHNIQUES FOR A HIGH SPEED SERIAL BUS

(75) Inventors: Jerrold V. Hauck, Fremont; David W. LaFollette, Sunnyvale, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/017,425

(22) Filed: Feb. 2, 1998

(51) Int. Cl.[7] .................................................. H04J 3/26
(52) U.S. Cl. ........................ 370/450; 370/462; 370/528; 710/119
(58) Field of Search ................................ 370/449, 450, 370/451, 452, 461, 462, 252, 445, 447, 458, 528; 710/100, 107, 113, 119

(56) References Cited

U.S. PATENT DOCUMENTS

| | | | |
|---|---|---|---|
| 4,581,734 A | * | 4/1986 | Olson et al. ................. 370/451 |
| 4,680,755 A | * | 7/1987 | Reamens .................... 370/451 |
| 5,465,254 A | * | 11/1995 | Wilson et al. ............... 370/452 |
| 5,495,481 A | | 2/1996 | Duckwall |
| 5,557,608 A | * | 9/1996 | Calvignac et al. .......... 370/462 |
| 5,604,748 A | * | 2/1997 | Date et al. .................. 370/461 |
| 5,802,057 A | * | 9/1998 | Duckwall et al. ........... 370/408 |

OTHER PUBLICATIONS

*P1394B Arbitration Acceleration*; Teener, Michael D. Johas, Firefly, Inc., 1997, Slides 1–9.
*P1394A Enhancements*, Jan. 3, 1997, pp. 1–48.

* cited by examiner

*Primary Examiner*—Ricky Ngo
(74) *Attorney, Agent, or Firm*—Blakely, Sokoloff, Taylor & Zafman LLP

(57) ABSTRACT

A method and apparatus of improving serial bus efficiency. Improvement of bus efficiency through the reduction of enforced subaction gaps can be accomplished by attaching an explicit end of subaction (EOS) token to packets that are the last packet of a subaction. The EOS should be selected to be an encoding that is not easily confused with any encoding used for normal data encoding. The presence of the EOS token permits arbitration to begin without waiting for a subaction gap after the EOS token is seen on the bus. Additionally, it permits fly by concatenation with packets containing an EOS token. In some cases multiple concatenations are possible. Because the EOS token is independent of subaction type, this technique expands readily as new subactions are developed. Employing the features overall bus efficiency can be increased.

14 Claims, 5 Drawing Sheets

ARBITRATION TECHNIQUES FOR A HIGH SPEED SERIAL BUS

BACKGROUND OF THE INVENTION (1) Field of the Invention

The invention relates to data transfer systems. More specifically, the invention relates to arbitration of access to a serial bus.

(2) Related Art

For high speed data transfers over a distance, various high speed serial data transfer mechanisms have been developed. The IEEE Standard for a High Performance Serial Bus, IEEE Std. 1394-1995 published Aug. 30, 1996 (1394-1995 Standard) and its progeny provide a high speed serial protocol which permits implementation of high speed data transfers. The existing progeny includes P1394a Draft Standard for a High Performance Serial Bus (1394a Standard) and P1394b Draft Standard for a High Performance Serial Bus (1394b Standard). Generically, systems implementing 1394-1995, 1394a, 1394b or subsequent revisions and modifications thereof are referred to herein as 1394 systems.

In 1394-1995 asynchronous arbitration is implemented using a simple timing strategy in which arbitration cannot begin until the bus has been idle for a predetermined period of time. This predetermined time period is known as a subaction gap. The subaction gap may vary from less than 0.5 microsecond to more than 10.5 microseconds depending on the size of the bus. The subaction gap is set to be greater than the worst case round trip propagation delay time across the bus. Accordingly, requiring the wait for a subaction gap before arbitration begins ensures that no node connected to the bus will begin arbitrating after a packet is transmitted before an acknowledgment packet (ACK) has had the opportunity to be transmitted and received. Unfortunately, the 1394-1995 Standard makes no distinction between an ACK and the other packets. Thus, after an ACK the subaction gap represents purely wasted bandwidth. Accordingly, one arbitration acceleration mechanism is ACK-accelerated arbitration. In ACK-accelerated arbitration when an ACK is seen on the bus arbitration can begin immediately without waiting for a subaction gap.

The 1394-1995 provides for one efficiency enhancement mechanism, basic concatenation. In basic concatenation when the first node sends a request to a second node, and the second node sends the first node an ACK, if the second node can access the data requested by the first node quickly enough it holds the bus after the ACK and concatenates the response packet onto the ACK. Similarly, 1394-1995 provides for concatenation of isochronous subactions sent by the same node. Fly by arbitration is a matter of expanding the scope of the basic concatenation mechanism. Particularly, when a node has a packet ready to transmit and is waiting to arbitrate for the bus and receives an unrelated ACK, the node merely concatenates its unrelated packet to the end of the ACK. The node then transmits the ACK and the concatenated packet out the non-receiving ports and only the concatenated packet out of the receiving port. An analogous fly by procedure applies to isochronous transactions.

If the ACK is received on an parent port it is likely that it is also being simultaneously received by another node. Therefore, in such case fly by arbitration is likely to result in packet collision which should be avoided. However, receiving a packet on a child port permits fly by arbitration either in the case where the received packet is an ACK or the received packet is an isochronous packet. Since the 1394 protocols make no guarantee about the order of packet transmission, as long as all nodes get to transmit asynchronous packets during a fairness interval and isochronous packets within an isochronous cycle, the bus is well behaved. ACK-accelerated and fly by arbitration improve bus efficiency in the case of ACKs and isochronous packets. However, a significant number of subaction gaps are still likely as several other asynchronous ackless subaction types exist. Among existing ackless subactions are: broadcast, self-ID, link on, asynchronous stream, and PHY ping subactions. The ackless subactions are particularly prevalent when the internet protocol is mapped onto the 1394 protocol. Additionally, new packet types can be expected to be developed from time to time. Taken together these factors will cause enforced subaction gaps to lower overall bus efficiency.

In view of the foregoing it would be desirable to develop improved arbitration enhancements to further reduce the inefficiency caused by subaction gaps.

BRIEF SUMMARY OF THE INVENTION

A method and apparatus for improving bus efficiency is disclosed. A determination is made if a packet to be transmitted is a last packet of a subaction. An end of subaction token is inserted at an end of the packet if the packet is a last packet of a subaction. The packet is then transmitted out at least one port.

DETAILED DESCRIPTION OF THE INVENTION

Improvement of bus efficiency through the reduction of enforced subaction gaps can be accomplished by attaching an explicit end of subaction (EOS) token to packets that are the last packet of a subaction. The EOS token should be selected to be an encoding that is not easily confused with any encoding used for normal data encoding. The presence of the EOS token permits arbitration to begin without waiting for a subaction gap after the EOS token i se on tile bus. Additionally, it permits fly by concatenation with packets containing an EOS token. In some cases multiple concatenations are possible. Because the EOS token is independent of subaction type, this technique expands readily as new subactions are developed. By employing these features, overall bus efficiency can be increased.

Figure 1:
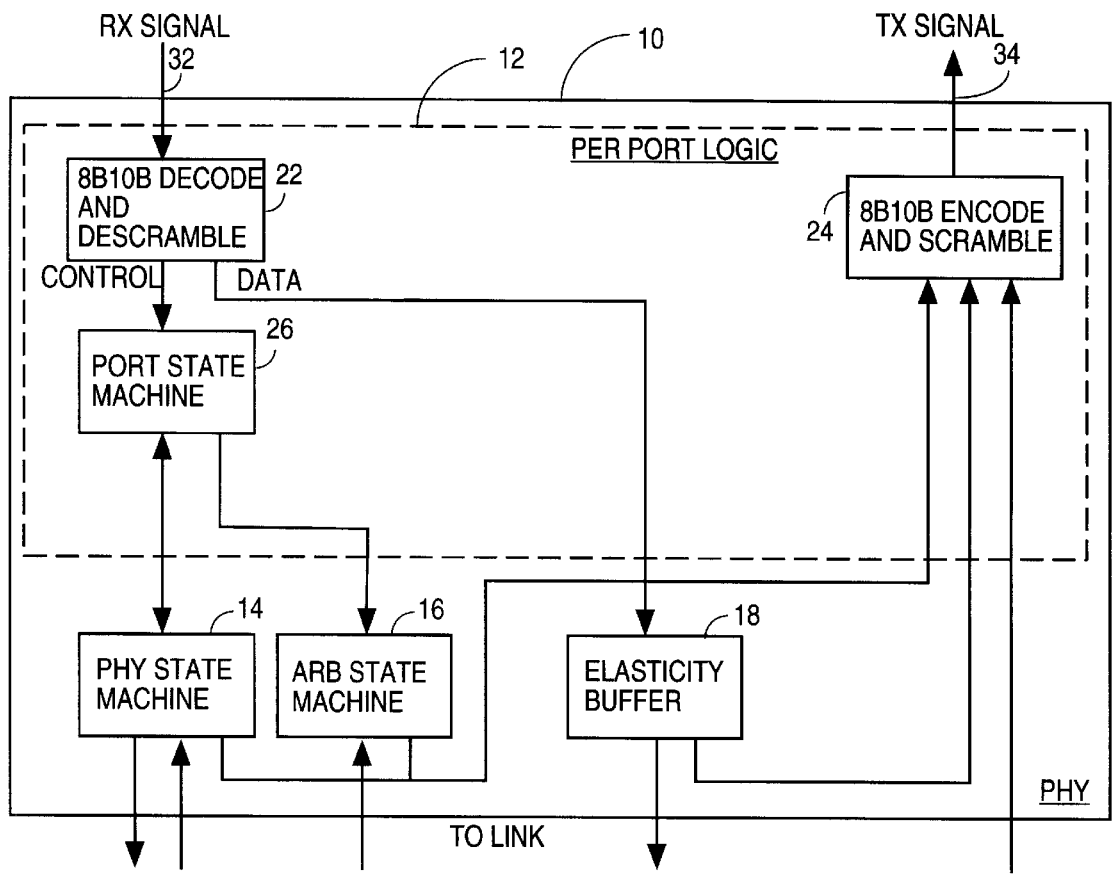
FIG. 1 is a block diagram of a PHY of one embodiment of the invention.

Now referring to FIG. 1, a physical layer (PHY) 10 is an example of a PHY that might be used in a 1394b system. However, the invention is nut specific to 1394b, and is expected to have significant utility in systems implementating 1394a and variants thereof. The PHY 10 has one or more ports which can be connected to a serial bus not shown. For each such port, per port logic 12 is provided as part of the PHY 10. The PHY 10 receives a receive signal 32 and transmits a transmit signal 34 through each active port. Per port logic 12 includes a decoder 22 to decode and descramble the incoming receive signal 32. In one embodiment the decoder 22 is an 8B10B decoder and descrambler, which performs 8-bit 10-bit decoding. This means each 10-bit value coming in as the receive signal 32 is decoded into an 8-bit value. The decoder 22 is coupled to a port state machine 26 which receives a control value decoded by the decoder. Similarly, an encoder 24 is used to encode and scramble the outgoing transmit signal 34, In one embodiment of the invention the encoder performs 8B10B encoding. Analogous to the decode case, each byte of data to be transmitted is encoded as a 10-bit value. Thus, a number of codings exist that are not used for normal data encoding.

Additionally, the decoder 22 is coupled to an elasticity buffer 18. The elasticity buffer 18 buffers data decoded from the received signal 32 while that data is awaiting transfer to the link and/or repetition out on one or more ports of the PHY 10 as the transmit signal 34. The PHY state machine 14 and the arbitration state machine 16 may be combined as a single state machine or may be implemented as two separate state machines. As used herein arbitration state machine refers to either a discrete state machine performing arbitration or the part of a larger state machine that performs arbitration functions. The PHY state machine 14 provides the intelligence for the PHY including generation of any PHY generated packets. The arbitration state machine 16 assesses incoming arbitration information and provides outgoing arbitration requests. If the node is the root node, the arbitration state machine 16 also grants arbitration requests.

In one embodiment of the invention, the PHY state machine identifies if a packet to be transmitted is a last packet of a subaction. In the case of a link generated packet it is preferred that the link or some higher layer notify the PHY 10 either through the PHY state machine 14 or possibly the encoder 24 directly, that the packet being sent is the last packet of the subaction. In this way the PHY state machine 14 can cause the encoder 24 to (or the encoder can on its own initiative) insert an end of subaction (EOS) token at the end of a packet to be transmitted. The use of an explicit EOS token permits arbitration to begin as soon as the EOS token is seen on the bus without waiting for a subaction gap.

Figure 2:
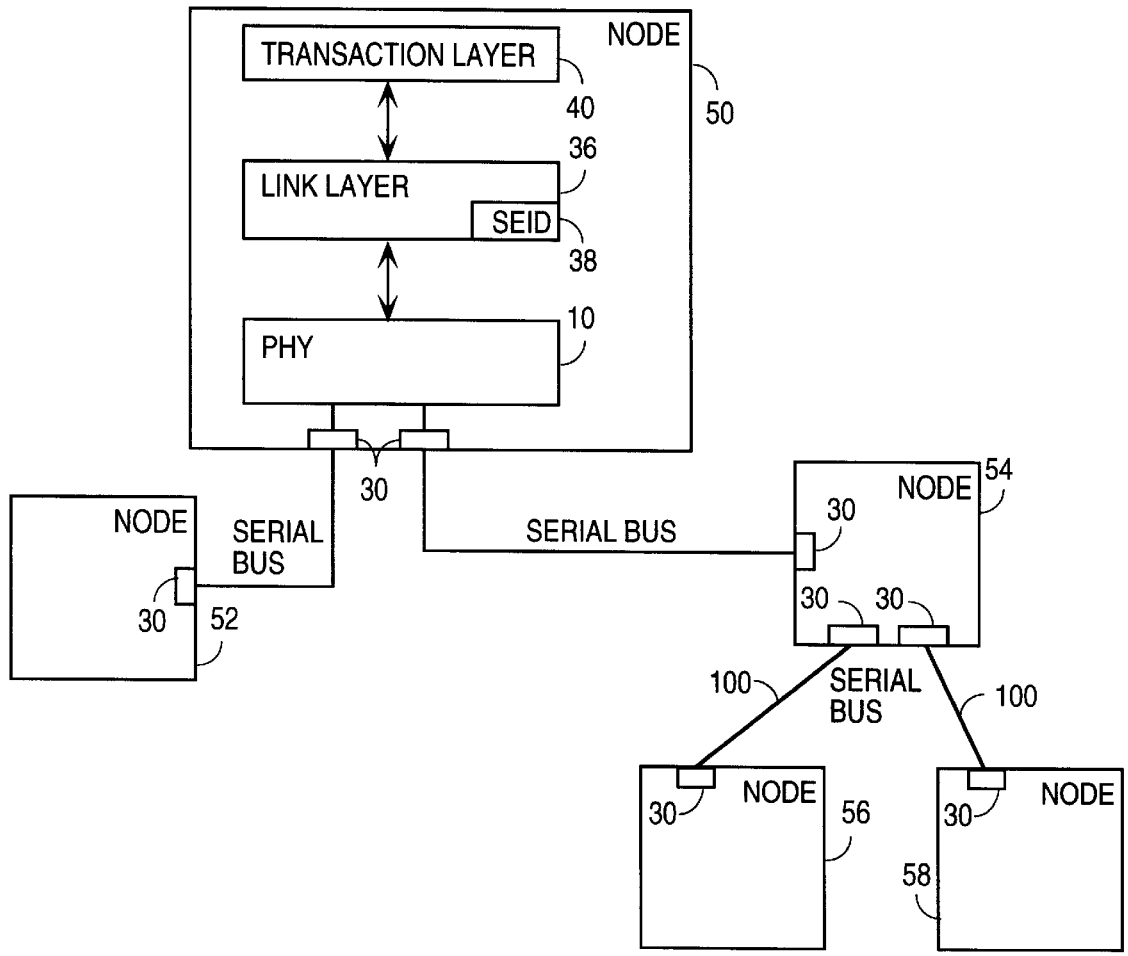
FIG. 2 is a block diagram of the system employing one embodiment of the invention.

Now referring to FIG. 2, which shows a system that includes a plurality of nodes 50–58. The nodes 50–58 are organized in a tree topology with node 50 as the root node, node 54 as a branch node and nodes 52, 56, 58 as leaf nodes. The nodes are all interconnected by serial bus 100. In one embodiment, serial bus 100 follows one of the 1394 protocols. Each node has one or more ports 30 through which communication between serial bus 100 and PHY 10 is conducted. The PHY 10 communicates with a link layer 36, which in turn communicates with a transaction layer 40. A link layer 36 includes a subaction end identifier (SEID) 38 to identify which link generated packets are a last packet of a subaction. The SEID 38 may communicate with the PHY state machine or directly with the encoder. As a result, the PHY 10 can attach an EOS token to the end of the packet if it is a last packet of a subaction. This will permit the use of fly by arbitration for any so identified packet received on a child port or accelerated arbitration (e.g. without waiting a subaction gap) when fly by arbitration is not permitted.

A typical packet includes a packet prefix, data, and an end of data (EOD) token. The EOD acts as an end bound for the packet. In one embodiment, if the packet is identified as being a last packet of a subaction, the EOD token is replaced with an EOS token. An alternative embodiment, the EOS token is attached immediately after the EOD token or some number of idle characters after the EOD token.

In an alternate embodiment when the PHY or link identify the packet to be a last packet of the subaction, instead of using tokens, the PHY may change an arbitration line state to signal an end of subaction. Such line state change may replace or follow the data end line state. Other variants are also within the scope and contemplation of the invention. Thus, this explicit end of subaction identification scheme has applicability in 1394a and variants thereof as well as 1394b.

Figure 3:
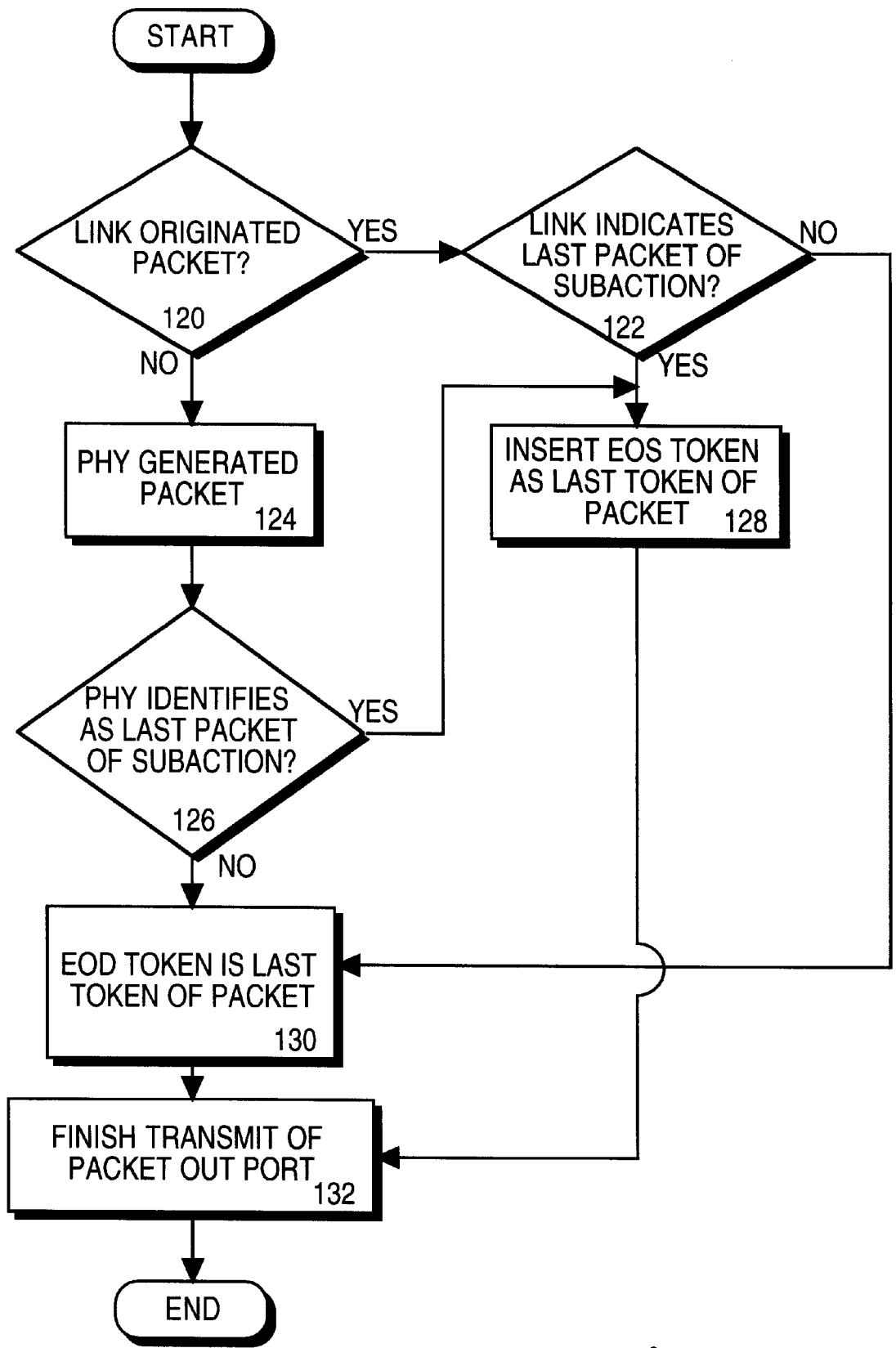
FIG. 3 is a flow chart of the process of indicating a packet to be an end of subaction packet in one embodiment of the invention.

Now referring to FIG. 3 at decision block 120, an implicit decision is made whether the packet is a link originated packet. If the packet is a link originated packet (as discussed above) the link is responsible for indicating whether the packet is a last packet of a subaction. The link may make this determination itself or may receive the indication from the transaction layer or higher layer within the node. In any event, the determination is made at decision block 122 if the link has indicated the packet to be a last packet of a subaction. If it has indicated the packet to be a last packet of a subaction the PHY will insert an EOS token as a last token of the packet at functional block 128. If the packet is not identified as a link originated packet at decision block 120, it is determined to be a PHY generated packet as indicated at functional block 124. At decision block 126, the PHY then identifies if the packet is a last packet of a subaction. If the packet is the last packet of a subaction the PHY causes the insertion of the EOS token as the last token of the packet at functional block 128. If it is not the last packet of a subaction either at decision block 122 or at decision block 126 an EOD token is inserted as the last token of the packet at functional block 130. After the last token is inserted in the packet, transmission of the packet out of a port is finished at functional block 132. While it is within the scope and contemplation of the invention to assemble an entire packet before beginning transmission, in most cases, it is desirable to begin transmission of the packet as tokens arrive such that some portion of packet will likely have been transmitted prior to the insertion of the last token whether it be an EOS token or a EOD token of the packet.

Figure 4:
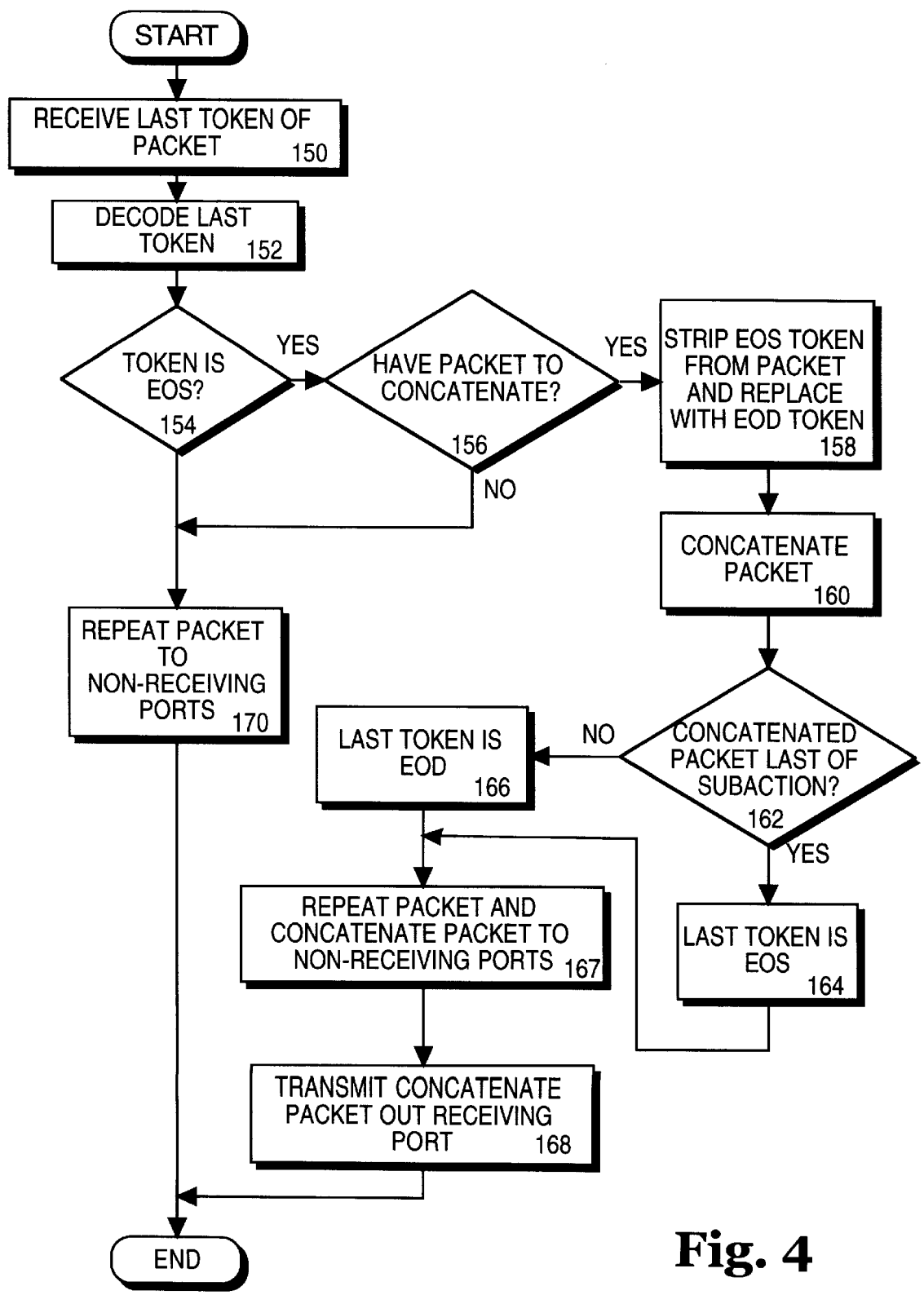
FIG. 4 is a flow chart of operation in a receiving node receiving a packet employing one embodiment of the invention.

Now referring to FIG. 4, at functional block 150, the node receives a last token of the packet. The last token is decoded at functional block 152. The determination is made at decision block 154 if the last token is an EOS token, if it is not the node simply repeats the packet to the non-receiving ports at functional block 170. If the token is an EOS token the determination is made at decision block 156 if the node has a packet to send. If not, the node repeats the packet to the non-receiving ports at functional block 170. If it does, a decision is made whether concatenation is allowed at decision block 157. This determination may include determining if the packet was received on a child port. If concatenation is not permitted, the packet is repeated to all non-receiving ports at functional block 172. After repeating the packet to all non-receiving ports, accelerated arbitration commences at functional block 171.

If concatenation is allowed the node strips the EOS token from the packet and replaces it with an EOD token at functional block 158. The PHY then concatenates the packet it wishes to send onto the received packet at functional block 160. A determination is then made at decision block 162, whether the concatenated packet is the last packet of a subaction. If it is, the last token of the concatenated packet is an EOS token at functional block 164. If it is not, the last token is an EOD token at functional block 166. The packet and concatenated packet are repeated out the nonreceiving ports at functional block 167 and the concatenated packet is transmitted out the receiving port at functional block 168.

One of ordinary skill in the art will recognize that the repeat of the initial packet received will likely begin before the last token of the packet is received at functional block 150. The transmission runs concurrently with the major flow of this diagram. This point may be clarified with reference to FIG. 5 below.

Figure 5:
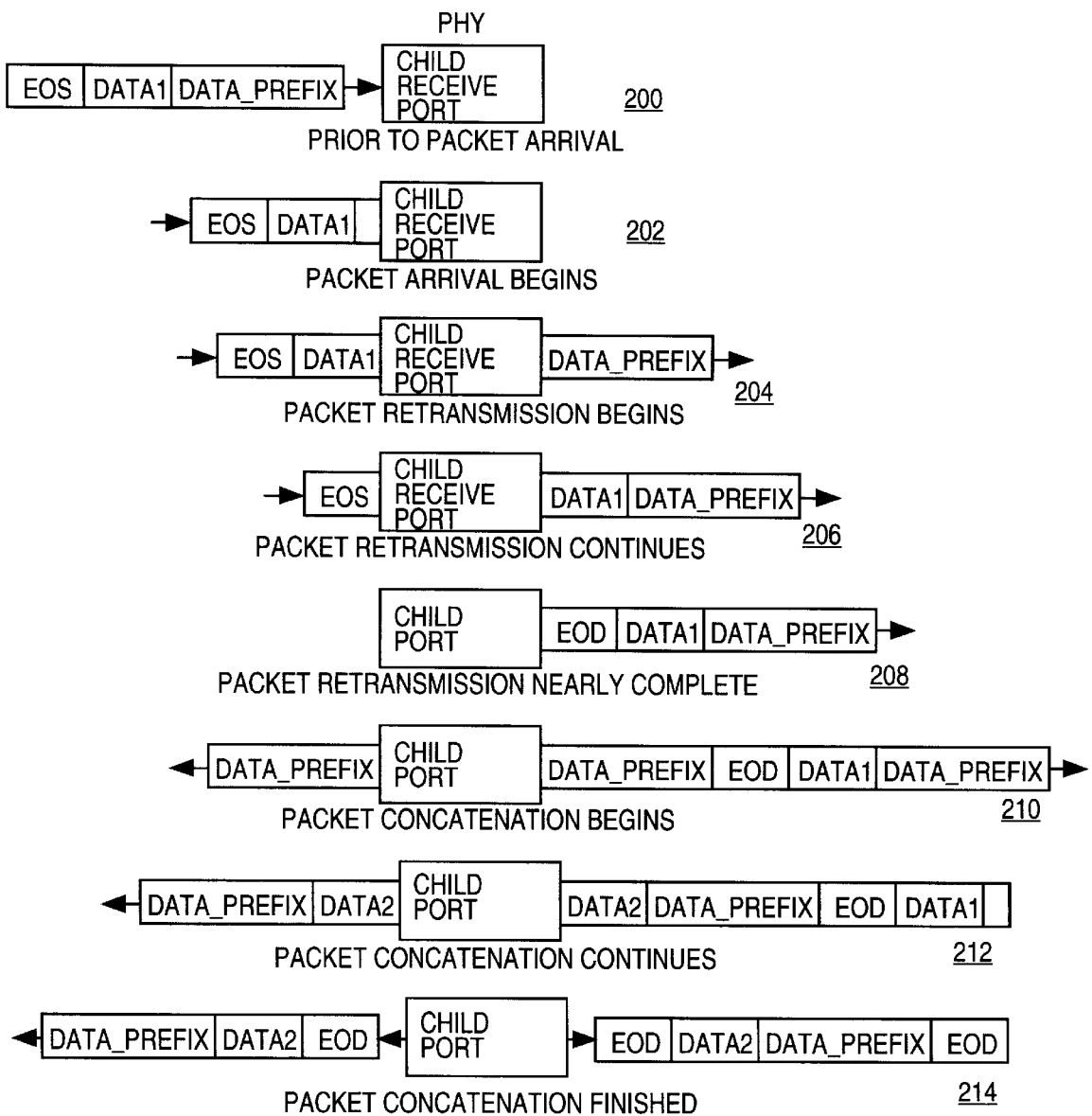
FIG. 5 is a diagram of the fly by arbitration in one embodiment of the invention.

Now referring to FIG. 5, at time 200, prior to packet arrival, the PHY's child receive port is open awaiting a packet. At time 202 packet arrival begins. The packet comprising a data prefix, data, and an end of subaction token begins propagating through the PHY. At time 204 retransmission begins on all active ports other than the receiving port. At time 204 as depicted, while the data prefix is already being retransmitted, data is still being received on the child receive port. At time 206 retransmission continues. At time 208 the retransmission is nearly complete but, the EOS token received has been stripped off and replaced with an EOD token in the retransmitted packet. At time 210 concatenation begins, both the receiving and non-receiving ports transmit the data prefix of the concatenated packet. At time 212, packet concatenation continues with transmission of DATA2 out all ports. Finally, at time 214 the last token of the concatenated packet is transmitted and the concatenation is finished. In this case, the last token is an EOD token indicating the packet is not a last packet of a subaction. This would be appropriate where the PHY is expecting the concatenated packet to be acknowledged. In the event that the concatenated packet was the last packet of a subaction (e.g. an ackless packet) the parent PHY of the PHY in FIG. 5 could analogously concatenate its own packet on to the end of the original packet and the subsequent concatenated packet. This process could continue up the tree. This multiple concatenation of asynchronous packets is not possible in prior art fly by techniques.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   determining if a packet is a last packet of a subaction;
   inserting an end of subaction (EOS) token at an end of the packet if the packet is the last packet of a subaction; and
   transmitting the last packet out at least one port.

2. The method of claim 1 wherein the end of subaction token replaces an end of data token that would otherwise delineate a boundary of the last packet.

3. The method of claim 2 further comprising:
   receiving the last packet at a first node;
   stripping an EOS token from the packet; and
   concatenating a new packet with the last packet.

4. The method of claim 3 further comprising:
   repeating the last packet out a non-receiving port; and
   transmitting the new packet out all active ports.

5. The method of claim 3 wherein if the concatenated packet is a last packet of a subaction a last token of the concatenated packet is an EOS token.

6. The method of claim 1 further comprising:
   receiving the EOS token on a bus; and
   commencing arbitration for the bus without waiting for a subaction gap.

7. An apparatus comprising:
   an encoder;
   a packet source coupled to the encoder to provide the encoder with a packet to be transmitted; and
   a state machine to determine if the packet is a last packet of a subaction wherein the encoder attaches an end of subaction token to the packet if the state machine determines the packet to be the last packet of the subaction.

8. The apparatus of claim 7 wherein the packet source is one of a link, a state machine, and a buffer.

9. The apparatus of claim 8 wherein if the link is the packet source, the link identifies if the packet is the last packet of the subaction.

10. A system comprising:
    a plurality of nodes each including a PHY, a link layer and a transaction layer; and
    a serial bus coupling the plurality of nodes together in a tree topology wherein a last token of a last packet of a subaction on the serial bus is an end of subaction (EOS) token generated by a sending PHY.

11. The system of claim 10 wherein a state machine in the PHY identifies if a PHY created packet is a last packet of a subaction and wherein the link informs the PHY if a link provided packet is a last packet of a subaction.

12. The system of claim 10 wherein a node begins arbitration for the serial bus less than a round trip propagation delay of the serial bus after receiving the EOS token.

13. The system of claim 10 wherein if a node waiting to arbitrate receives the EOS on a child port it concatenates a packet to the end of the received packet.

14. The system of claim 13 wherein if the packet concatenated is a last packet of a subaction the packet concatenated ends in an EOS token.

* * * * *

UNITED STATES PATENT AND TRADEMARK OFFICE
CERTIFICATE OF CORRECTION

PATENT NO.    : 6,356,558 B1
DATED         : March 12, 2002
INVENTOR(S)   : Hauck et al.

It is certified that error appears in the above-identified patent and that said Letters Patent is hereby corrected as shown below:

Column 2,
Line 53, delete "i se on tile", insert -- is seen on the --.
Line 62, delete "nut", insert -- not --.

Signed and Sealed this

First Day of October, 2002

Attest:

Attesting Officer

JAMES E. ROGAN
Director of the United States Patent and Trademark Office